Patented July 4, 1950

2,513,642

UNITED STATES PATENT OFFICE 2,513,642

ALKOXYMETHOXYALKYL VINYL ETHERS

William F. Gresham, Wilmington, Del., assignor to E. I. du Pont de Nemours & Company, Wilmington, Del., a corporation of Delaware No Drawing. Application May 19, 1948, Serial No. 28,052

2 Claims. (Cl. 260—614)

This invention relates to new compositions of matter and to methods for their preparation.

An object of the present invention is to provide a process for the preparation of vinyl ethers and the products thereby prepared. Another object is to provide a process for the preparation of substituted vinyl ethers from alkoxymethoxy alkanols and acetylene. A further object is to provide a new composition of matter methoxymethoxyethyl vinyl ether by the reaction of methoxymethoxyethanol with acetylene. Other objects and advantages of the invention will hereafter appear.

According to this invention there are provided new alkoxymethoxyalkyl vinyl ethers corresponding to the general formula

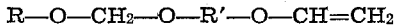

R—O—CH$_2$—O—R'—O—CH=CH$_2$ wherein R is an alkyl radical containing from 1 to 15 carbon atoms and R' is a bivalent acyclic hydrocarbon radical containing from 2 to 7 carbon atoms.

The new alkoxymethoxyalkyl vinyl ethers of this invention are obtained by reacting an alkoxymethoxyalkanol, in which the alkyl of the alkoxy radical contains from 1 to 15 carbon atoms and the alkanol radical contains from 2 to 7 carbon atoms, with acetylene, in an alkaline medium under a pressure in excess of 100 lbs./sq. in. and a temperature of from 100° to 250° C.

In one embodiment, a pressure reactor is charged with the alkoxymethoxy alkanol and with from 1.5 to 3% by weight of an alkali metal hydroxide, the reactor is flushed with oxygen-free nitrogen and then evacuated. The reactor is then pressured with acetylene to about 100 lbs./sq. in., evacuated, and repressured with acetylene. The charged reactor is placed on a rocker mechanism equipped for heating and agitating the contents of the reactor. After the reaction mixture has reached the selected reaction temperature, the pressure within the reactor is adjusted to between 100 and 300 lbs./sq. in. by injection of acetylene. The pressure within the reactor is maintained within the selected range for from 10 to 20 hours. After this period of reaction, the reactor is permitted to cool, the excess acetylene is bled from the reactor, and the contents discharged. The reaction product is diluted with from one-third to one-half its volume with diethyl ether, the solution is extracted with water to remove unreacted alkoxymethoxyalkanol and alkali metal hydroxide, and the ether solution dried with anhydrous potassium carbonate. The dried extract is then subjected to distillation to remove the diethyl ether and recover the alkoxymethoxyalkyl vinyl ether.

The examples which follow illustrate preferred embodiments of the invention. Unless otherwise indicated parts are by weight.

*Example 1.*—A stainless pressure reactor was charged with methoxymethoxyethanol and powdered potassium hydroxide in the proportions 100:2.5, respectively, the total charge occupying not more than 60% of the volume capacity of the reactor at room temperature. The vessel was then flushed with oxygen-free nitrogen, closed, pressured to 500 lbs./sq. in. with nitrogen. The reactor was evacuated, pressured with acetylene to about 100 lbs./sq. in., re-evacuated, and again pressured with acetylene to 100 lbs./sq. in. The charged reactor was rocked and heated to an internal temperature of 175° C. at which point additional acetylene was injected to a top pressure of 220 lbs./sq. in. The rocking was continued and the temperature held at 175° C. for 12 hours. During this period the pressure was maintained in the range 200–220 lbs./sq. in. by injection of additional acetylene whenever the pressure dropped to 200 lbs./sq. in.$^2$. At the end of the 12-hour period the reactor was allowed to cool to room temperature, the excess acetylene was bled off, the vessel was opened and the contents were discharged. The reaction product, diluted with about half its volume of diethyl ether, was extracted successively with 5 portions of water each of about one-tenth the initial volume of the product. The washed solution was dried over anhydrous potassium carbonate and then fractionated through an efficient distillation column. The methoxymethoxyethyl vinyl ether thus obtained boiled at 44° C./10 mm.; $n_D^{25}$ 1.4224, $d_4^{25}$ 0.961. The yield was 80–90% of the theoretical amount, based on methoxymethoxyethanol.

*Example 2.*—To prepare butoxymethoxyethyl vinyl ether the procedure of Example 1 is followed using butoxymethoxyethanol in place of methoxymethoxyethanol. Fractionation of the dried ether solution of washed product gives butoxymethoxyethyl vinyl ether in 80–90% of the theoretical yield based on butoxymethoxyethanol; B. P. 74° C./6 mm., $n_D^{25}$ 1.4224, $d_4^{25}$ 0.9215.

*Example 3.*—To prepare ethoxymethoxyethyl vinyl ether butoxymethoxypentyl vinyl ether, octyloxymethoxypropyl vinyl ether, hexoxymethoxyethyl vinyl ether, octyloxymethoxyethyl vinyl ether, pentadecyloxymethoxyethyl vinyl ether and methoxymethoxyheptyl vinyl ether, the procedure of Example 1 is followed using, respectively, ethoxymethoxyethanol, butoxymethoxypentanol, octyloxy methoxy propanol, hexoxymethoxy ethanol, octyloxymethoxy ethanol, pentadecyloxymethoxy ethanol and methoxymethoxyheptanol in place of methoxymethoxyethanol.

The products of the invention are valuable intermediates for the preparation of other organic compounds. They may, for example, be hydrogenated to give improved plasticizers and softeners for cellulose esters and ethers and for the polyvinyl chlorides and similar polymers. They may be reacted with nitriles, amines, mercaptans to provide surface active products, or may be used as produced where unsaturated compounds of extended chain length are desired.

I claim:

1. An alkoxymethoxyalkyl vinyl ether corresponding to the formula

R—O—CH$_2$—O—R'—O—CH=CH$_2$ wherein R is an alkyl radical containing from 1 to 15 carbon atoms and R' is a bivalent acyclic hydrocarbon radical containing from 2 to 7 carbon atoms.

2. Methoxymethoxyethyl vinyl ether: boiling point 44° C. at 10 mm.; $n_D^{25}$ 1.4151, $d_4^{25}$ 0.961.

WILLIAM F. GRESHAM.

REFERENCES CITED

The following references are of record in the file of this patent:

UNITED STATES PATENTS

| Number | Name | Date |
|---|---|---|
| 2,021,869 | Reppe et al. | Nov. 19, 1935 |
| 2,157,348 | Reppe et al. | May 9, 1939 |
| 2,191,053 | Walter | Feb. 20, 1940 |
| 2,201,074 | Britton et al. | May 14, 1940 |
| 2,406,674 | Evans | Aug. 27, 1946 |

FOREIGN PATENTS

| Number | Country | Date |
|---|---|---|
| 15,806 | Great Britain | July 2, 1914 |

Certificate of Correction

Patent No. 2,513,642 July 4, 1950

WILLIAM F. GRESHAM

It is hereby certified that error appears in the printed specification of the above numbered patent requiring correction as follows:

Column 2, line 26, for "sq. in.²" read $in.^2$; line 39, for "1.4224" read $1.4151$;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*